United States Patent [19]

Wright et al.

[11] Patent Number: 4,983,035

[45] Date of Patent: Jan. 8, 1991

[54] LASER MEASURING DEVICES

[75] Inventors: John V. Wright, Stafford; Thomas A. Rabson; Michael D. Reifel, both of Houston, all of Tex.

[73] Assignee: Reiton Ltd., Houston, Tex.

[21] Appl. No.: 211,275

[22] Filed: Jun. 24, 1988

[51] Int. Cl.[5] .............................................. G01B 11/16

[52] U.S. Cl. ........................................ 356/32; 73/775; 73/800; 356/373; 372/20; 372/92

[58] Field of Search .................... 356/32, 373; 73/774, 73/775, 777, 800; 372/20, 92

[56] References Cited

U.S. PATENT DOCUMENTS

| | | | |
|---|---|---|---|
| 4,275,599 | 6/1981 | Kohlenberger et al. | 356/32 |
| 4,409,842 | 10/1983 | Scott et al. | 73/800 |
| 4,452,533 | 6/1984 | Miles et al. | 356/357 |
| 4,475,812 | 10/1984 | Buczek et al. | 356/349 |
| 4,655,597 | 4/1987 | Tamamoto et al. | 356/373 |

*Primary Examiner*—Richard A. Rosenberger
*Attorney, Agent, or Firm*—Gunn, Lee & Miller

[57] ABSTRACT

In the present apparatus, a system converting stress in a structural member into strain by positioning a body of lasing material (creating a coherent beam) on a structural member. The body has parallel end faces. One is opposite a mirror attached to the structural member. The member strain varies laser cavity spacing and modulates the laser beam as a function of strain.

9 Claims, 2 Drawing Sheets

LASER MEASURING DEVICES

BACKGROUND OF THE DISCLOSURE

As set forth in the above referenced disclosure, incorporated by reference, a laser device can be used to encode strain or other measured variations occurring within a structural member in the form of a laser beam. More particularly, a structural member which is typically loaded with compressive or tensile stress will routinely flex or yield in response to the stress loading. If in tension, the member will elongate, thereby forming strain which is proportional to or related to the stress placed on the member. Stress in the opposite direction causes strain of the opposite sign. The present disclosure sets forth particular and specific embodiments of strain encoding lasers which thereby emit such laser beams. That is, the present apparatus describes specific arrangements of laser devices converting the strain or other measured variations of the monitored structural member into a laser beam frequency variation which can be easily transmitted away from the member, thereafter intercepted at a remote location, decoded and interpreted. In a manner of speaking, it provides a type of strain (or measurement) gauge which is attached to the structural member undergoing tests wherein the signal from the gauge is coupled away from the structural member free of entangling wires or cables. Therefore the disclosed laser device can be used as a measurement system, or as a telemetry system, or both as a measurement and telemetry system.

The present apparatus sets forth a laser body which defines a solid body of active material capable of lasing action wherein the body is cooperative with two or more reflective surfaces, or mirrors, thereby encoding the measured strain inforamtion in an emitted beam from the laser. The reflectivity of the mirrors is adjusted to assure that the beam is emitted from a selected end face or faces of the body of lasing material. Moreover, a separate or remote (external) reflective mirror can also be included and is installed parallel to the faces of the laser body. This external reflective mirror is incorporated to direct the laser beam from a remote point back into the body for modification of the coherent beam generation occurring in the body. There is a space or gap established between the laser body and external mirror, the space or gap enabling the mirror to be affixed remote from the lasing body. This spacing for mirror and laser body enables the geometry of the measuring device to be modified for attachment to the structural member of interest, which thereby allows length L over whioh strain measurements are made to be adjusted, and allows encoding of strain in the laser frequency.

The laser beam is thus generated within the cavity comprised of lasing material, is directed out one end face thereof, is transmitted through a distance (or space) to be reflected from the external mirror, and is directed back into the laser body. This reinforces the beam generation occurring in the laser body which thereby defines coherent beam formation and beam frequency which is emitted out of the laser body. The emitted beam is then directed either from the second face of the body, or from the external mirror, encoding changes in the component spacing L so that beam frequency is a function of strain occurring in the structural member in the length L.

Recall that the external mirror and laser body are attached to the structural member. The spacing between the two components establishes a standing wave between the components. If the spacing is varied, the standing wave is varied so that a change of frequency occurs wherein frequency change is dependent on change in spacing or dL.

The present apparatus sets forth alternate embodiments including an extended cavity arrangement between the laser body and external mirror and an alternate coupled cavity arrangement. These various embodiments relate in part to the types of reflective or transparent finishes applied to the end faces of the laser body and to the external mirrors. Recall that a laser body typically operates with spaced faces wherein the coherent beam is formed between the faces.

The present apparatus is summarized as a lasing bodY equipped with parallel partially reflective end faces and a spaced reflective mirror, that could be 100% or partially reflective. The two components are supported by a mounting means on a structural member to measure stress in that member where the stress is converted into strain and the strain varies the spacing between components. When spacing is varied, the frequency is varied by spacing and hence by stress.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

Figure 2:
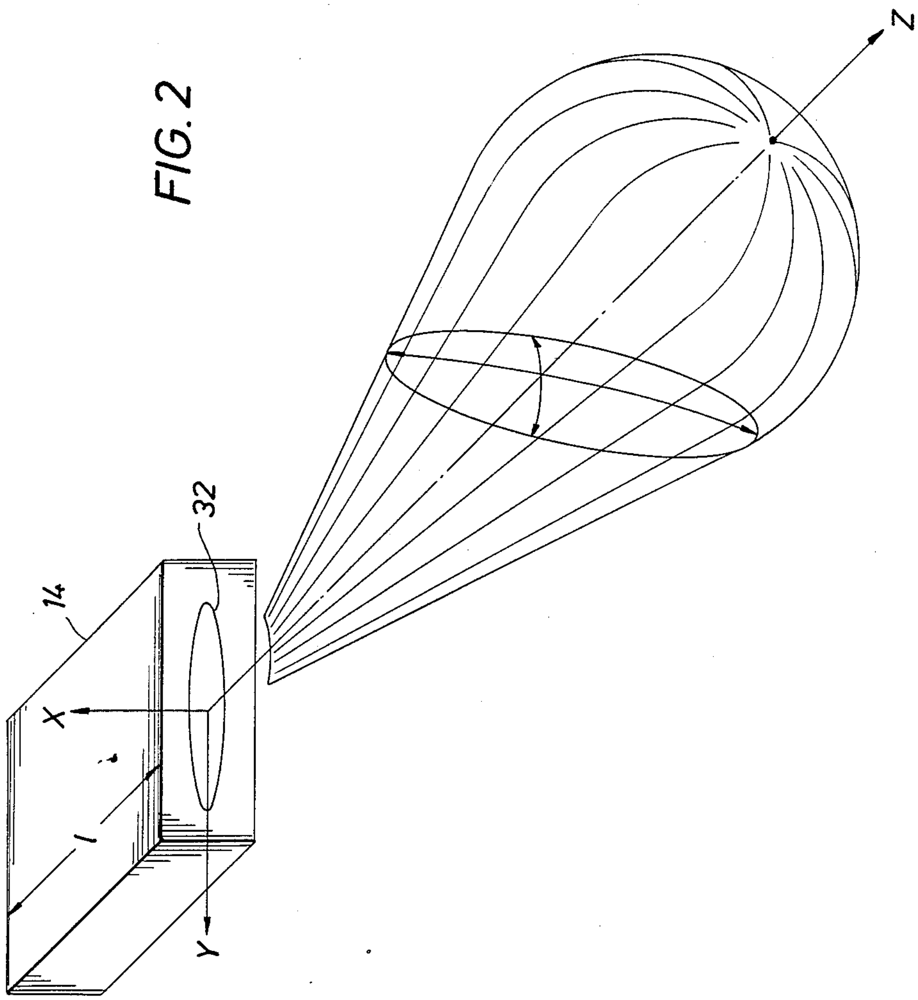
Figure 1:
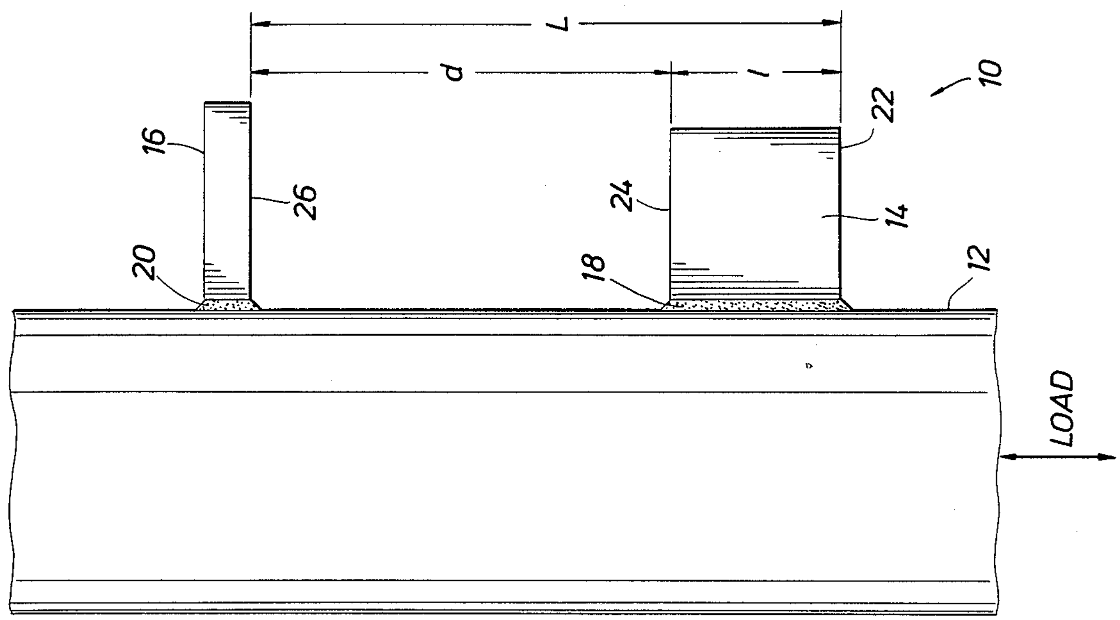
Figure 5:
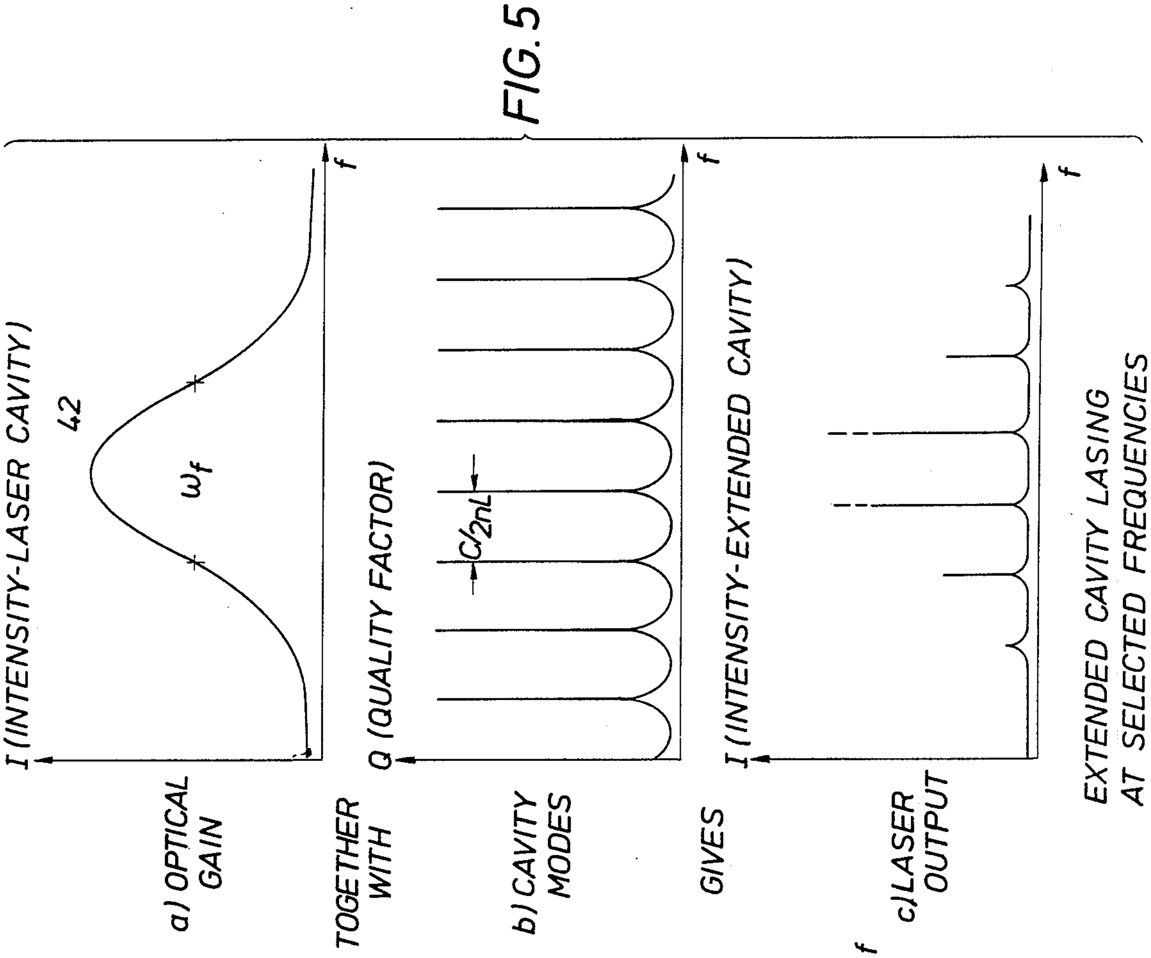
Figure 3:
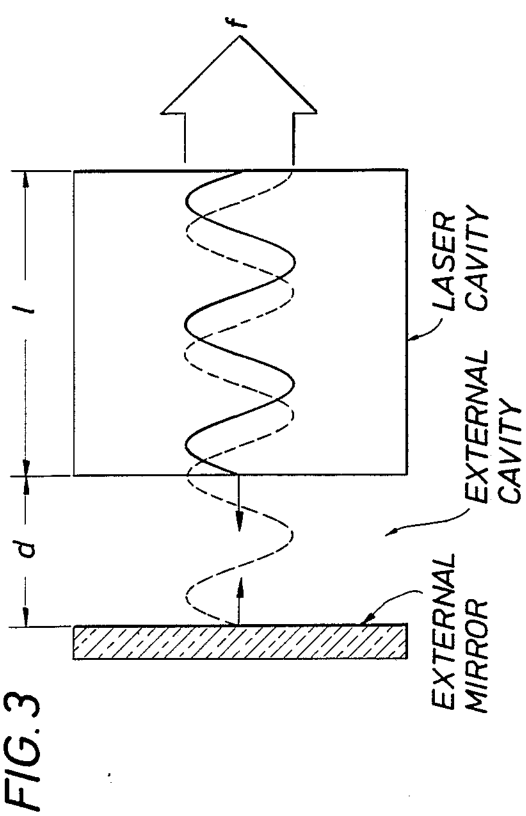
Figure 4:
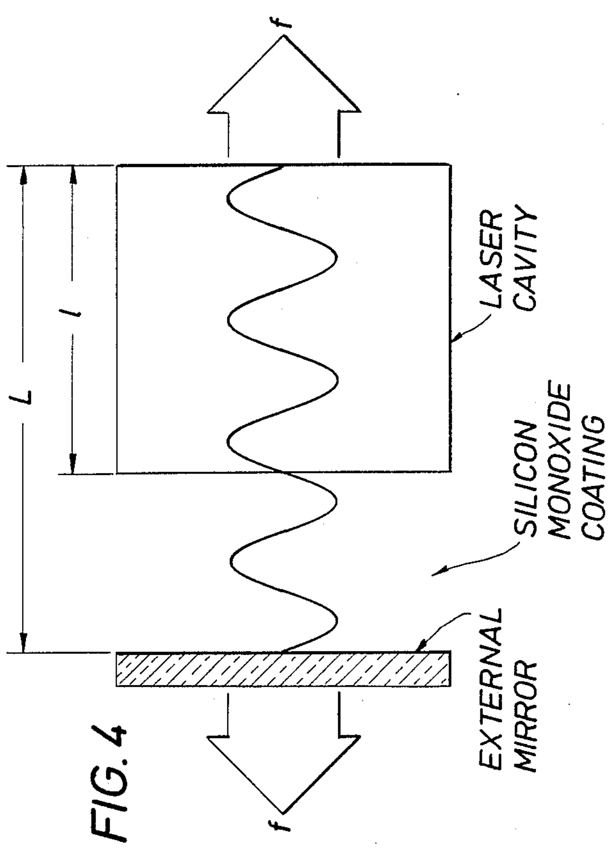

FIG. 1 shows a laser measuring device which encodes structural member stress into an emitted laser beam;

FIG. 2 is an isometric view of a laser showing the beam emitted from one face thereof;

FIG. 3 is a schematic view of the relationship of a laser cavity and cooperative mirror;

FIG. 4 is a view similar to FIG. 3 showing a modified form of reflective surface on the cavity body, thereby establishing a type of extended cavity; and FIG. 5 shows related graphs of laser current versus frequency to thereby illustrate selected lasing frequencies.

DETAILED DESCRIPTION OF THE PREFERRED EMBODIMENT

Attention is first directed to FIG. 1 of the drawings where the numeral 10 identifies a laser encoding system which converts stress acting on a column or other structural member 12 where the stress causes strain in the frame member and the strain is measured by the apparatus 10. The apparatus includes a rectangular block 14 which is positioned opposite a reflective mirror 16. A first substrate layer 18 is attached to the frame member 12 to glue or otherwise anchor the rectangular blook of lasing material in position. A similar substrate layer 20 anchors the mirror 16. Thus, the joinder means includes the substrate means at 18 and 20 which fixedly hold the members in spaced parallel positions relative to one another.

The laser body 14 incorporates an end face 22 which is parallel with the opposite end face 24 and the additional separate face 26. The three faces are parallel, spaced at specific distances, and cooperate with one another and the active material of the laser body 14 to provide the coherent output beam to be described. The body 14 has a specified length L while the end face 24 is spaced from the mirror surface 26 by the distance d wherein the total length of the system is given by the symbol L wherein L=d+l.

The surfaces 22 and 24 are provided with an appropriate measure of anti reflection coating. The mirror surface 26 is coated for full or partial reflection. More will be noted regarding the reflectivity of the other surfaces.

Equation (1) given below defines the frequency of the lasing action at the body 14;

$$F=mC/2nL \tag{1}$$

where:

F=frequency in hertz, m is an integer,

C is the velocity of light in vacuum, n is the index of refraction of the intracavity material, and L is the length of the cavity in FIG. 1.

Assume the index of refraction of all the intracavity material is the same. Taking the derivative of Equation (1) with respect to the length L then obtains Equation (2).

$$dF/dL=-mC/2nL^2 \tag{2}$$

This leads to Equation (3) which is the incremental approximation from Equation (2).

$$\Delta f = (-mC/2nL^2)\Delta L \tag{3}$$

$\Delta f$ = change in frequency $\Delta L$ = change in length

Equation (3) indicates that the relationship is a linear relationship. That is, strain causes a proportional frequency shift. This would remain true so long as ΔL is much less than cavity length L. Note that L is the length illustrated in FIG. 1. Attention is directed to FIG. 2 of the drawings where the laser body 14 is illustrated. There, it will be observed that one of the end faces of the body is provided with an optical aperture 32 which is located with respect to an XYZ coordinate system whereby a coherent beam is transmitted along the Z axis. The beam emitted through the aperture 32 is created in response to current flow into the laser cavity. The body 14 thus functions in response to current flow to create the laser beam which is emitted from the optical aperture 32 which is formed in one of the two refleotive end faces.

Attention is now directed to FIG. 3 of the drawings which shows operation of the cavity cooperative with the spaced mirror. FIG. 3 depicts the to and fro wave motion from the laser cavity to the mirror. The beam is reflected at the mirror and back into the cavity. The interface depends on the degree of reflectivity of the antireflection coating at the cavity face fronting the mirror. In this arrangement of FIG. 3, incremental variations in the spacing d produce incremental changes in frequency. So to speak, such small variations are proportionally encoded as changes in frequency and therefore spacing can be measured as a function of frequency.

The embodiment of FIG. 3 shows how variations in the spacing of the distance d are encoded into the frequency output. That is, the output frequency changes in proportion to the variations in spacing over certain ranges. Since the output signal can be precisely measured and the shift can be precisely determined, the precise measurements of strain can also be obtained. It should be observed that this measurement reflects variations in the structural member along the distance d. This occurs because the external mirror is an active component of the lasing cavity. That is, the material which comprises the laser forming member is excited, forms an output wave which is directed through a distance to the external mirror and this beam signal is then wholly or partially reflected back into the cavity and reinforces the coherent laser beam therein. The energy which is transmitted out of the cavity is reflected back into the cavity to sustain the coherent process in this fashion. An important factor is the incorporation of a particular coating on the two ends of the laser cavity. The coating should have controlled reflective characteristics to assure that a requisite portion of the beam is kept inside the cavity while a portion passes through the face and is wholly or partially reflected by the external mirror. To this end, the amount of reflection can be modified so that the requisite reflective transfer occurs. In like fashion, the face at the opposite side has controlled reflection so that the emitted coherent beam has substantial beam power wherein the signal is transmitted over some distance for subsequent interception and utilization. The frequency which prevails in the coupled cavity arrangement is in part therefore determined by the precise position of the external mirror subject to variations with stress, so that strain is properly encoded into the beam frequencY.

In FIG. 4 of the drawings, the cavity is provided with an antireflection coating, one embodiment being a coating of necessary thickness formed of silicon monoxide. This creates the standing wave between the external mirror and the far end of the cavity, as described in FIG. 1 In other words, the silicon monoxide coating prevents lasing within the cavity length l, and instead lasing occurs within the extended cavity length L with the prevailing wave pattern extending over the length L. The extended cavity includes the reflective face of the external mirror. In this instance, the variations in output frequency are dependent on and encode variations in length of the distance L. The contrast between FIGS. 3 and 4 shows that the strain is considered over the length L in FIG. 4 but only the shorter distance d in FIG. 3. There is, however, a significant difference in the mode of operation of the two cavity systems contrasted in FIGS. 3 and 4.

FIG. 5 shows three particular wave forms which are very helpful in understandinq the apparatus. The optical gain of the active material is graphed at the top of FIG. 5 and shows a bell shaped curve 42 representing device optical gain (without mirrors) graphed as a function of frequency. $W_f$ is the width of the gain profile. It will be understood that the intermediate graph 5(*b*) shows the quality factor Q as a function of cavity frequencies. The cavity resonates at specific frequencies as indicated by the peaks in the graph. FIG. 5 further shows in the lower graph at 5(*c*) how the laser output is proportional to the product of the two upper curves, and hence, the finite frequency signals are established during laser operation. By making $C/2nL >> W_f$ the laser can be made to operate in a single mode. The incremental frequency shift is from the established base frequency.

The material which comprises the laser cavity can be any conventional laser material, one example being gallium-aluminum-arsenide. Other materials can be used so long as they have the appropriate physical parameters.

While the foregoing is directed to the preferred embodiment, the claims determine the scope of the present disclosure.

We claim:

1. A strain gauge system, comprising:
   (a) an elongate laser body formed of active material capable of lasing, said body forming a laser beam output;
   (b) a reflective mirror cooperative with said laser body for directing laser beam reflections from said mirror through said body; and
   (c) mounting means for joining said laser body and reflective mirror on a member subject to strain, said member during strain moving said body and reflective mirror proportional to strain such that laser beam output from said laser body encodes strain in the laser beam and wherein said mounting means maintains said laser body and said reflective mirror in a line parallel to the line in which strain is to be measured and further wherein said laser body and said reflective mirror form an extended cavity longer than the laser body.

2. The system of claim 1 wherein said laser body has a pair of spaced, parallel end faces and said mirror is parallel thereto and remote therefrom.

3. The system of claim 2 wherein said body transmits a beam from an end face to reflect from said mirror.

4. The system of claim 1 wherein said strain gauge system forms an extended cavity between said reflective mirror and within said laser body of active material.

5. The system of claim 4, wherein said laser body of active material has one end face with a specified anti-reflection material thereon to define a coherent laser beam within the cavity of claim 4 and the laser body.

6. The system of claim 1 wherein said strain gauge system emits a laser beam from an aperture on said elongate laser body and said body forms a laser cavitry directing a laser beam from said cavity.

7. The system of claim 1 wherein said laser body and reflective body are spaced from one another so that the member subject to strain forms variations in spacing as a result of said strain, which is encoded as shifts in the laser beam frequency.

8. The system of claim 1 wherein said mirror is 100% reflective.

9. The system of claim 1 wherein said mirror reflects into an end face of said body.

* * * * *